(12) United States Patent
Tsuboi et al.

(10) Patent No.: US 12,528,250 B2
(45) Date of Patent: Jan. 20, 2026

(54) FORMED ARTICLE PRODUCING METHOD

(71) Applicant: SEIKO EPSON CORPORATION, Tokyo (JP)

(72) Inventors: Tatsuya Tsuboi, Okaya (JP); Kenta Anegawa, Matsumoto (JP); Hirotsugu Ota, Minowa-machi (JP); Riona Toda, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 290 days.

(21) Appl. No.: 18/329,489

(22) Filed: Jun. 5, 2023

(65) Prior Publication Data

US 2023/0391010 A1  Dec. 7, 2023

(30) Foreign Application Priority Data

Jun. 6, 2022  (JP) .................................. 2022-091459

(51) Int. Cl.
*B29C 64/357* (2017.01)
*B29C 33/38* (2006.01)
(Continued)

(52) U.S. Cl.
CPC ........ *B29C 64/357* (2017.08); *B29C 33/3842* (2013.01); *B29C 64/165* (2017.08);
(Continued)

(58) Field of Classification Search
CPC . B29C 64/357; B29C 33/3842; B29C 64/165; B29C 64/314; B29C 2793/009;
(Continued)

(56) References Cited

U.S. PATENT DOCUMENTS 9,902,115 B1 *  2/2018  Janson ................ B29B 17/0005
2020/0130231 A1 *  4/2020  Rückborn ................ B29B 9/06
(Continued)

FOREIGN PATENT DOCUMENTS

JP    2022-010642 A    1/2022
JP    2022-090380 A    6/2022

OTHER PUBLICATIONS

Acrylite FF (Tech Brief—#4 Drilling, https://www.tapplastics.com/image/pdf/Tech%20Data-Drilling.pdf, available in public at least on Nov. 19, 2021 or after) (Year: 2021).*
(Continued)

*Primary Examiner* — Xiao S Zhao
*Assistant Examiner* — Inja Song
(74) *Attorney, Agent, or Firm* — WORKMAN NYDEGGER

(57) ABSTRACT

A formed article producing method, includes a first step of shaping a shaping body by ejecting a shaping material including a thermoplastic resin and of forming a first formed article by cutting the shaping body with a first rotating tool; a second step of generating recycling material by cutting the first formed article with a second rotating tool; and a third step of forming a second formed article by ejecting the recycling material that was plasticized, wherein in the second step, the first formed article is cut under at least one condition of a condition that a moving speed of the second rotating tool is faster than a moving speed of the first rotating tool in the first step or a condition that a rotating speed of the second rotating tool is slower than a rotating speed of the first rotating tool in the first step.

10 Claims, 16 Drawing Sheets

(51) Int. Cl.
  *B29C 64/165* (2017.01)
  *B29C 64/314* (2017.01)
  *B29K 105/26* (2006.01)
  *B29K 505/00* (2006.01)
  *B29L 31/00* (2006.01)
  *B33Y 10/00* (2015.01)
  *B33Y 40/20* (2020.01)

(52) U.S. Cl.
  CPC ...... *B29C 64/314* (2017.08); *B29C 2793/009* (2013.01); *B29K 2105/26* (2013.01); *B29K 2505/00* (2013.01); *B29L 2031/757* (2013.01); *B33Y 10/00* (2014.12); *B33Y 40/20* (2020.01)

(58) Field of Classification Search
  CPC . B29C 64/118; B29C 64/188; B29K 2105/26; B29K 2505/00; B29L 2031/757; B33Y 10/00; B33Y 40/20; B22F 1/065; B22F 10/18; B22F 10/66; B22F 12/82
  See application file for complete search history.

(56) References Cited

U.S. PATENT DOCUMENTS

| | | | |
|---|---|---|---|
| 2021/0394441 A1* | 12/2021 | Rzadkowski | B33Y 10/00 |
| 2021/0402657 A1 | 12/2021 | Anegawa | |
| 2022/0176620 A1 | 6/2022 | Anegawa | |

OTHER PUBLICATIONS

A proof of the date in public of Acrylite FF (A screen shot of the Wayback Machine with the address of https://www.tapplastics.com/image/pdf/Tech%20Data-Drilling.pdf, available in public at least on Nov. 19, 2021 or after) (Year: 2021).*

* cited by examiner

| | CONDITION 1 | CONDITION 2 | CONDITION 3 | CONDITION 4 | CONDITION 5 | CONDITION 6 | CONDITION 7 | CONDITION 8 |
|---|---|---|---|---|---|---|---|---|
| ROTATIONAL SPEED (rpm) | 2000 | 2000 | 2000 | 100 | 100 | 100 | 100 | 100 |
| WORK AMOUNT / BLADE | 0.06 | 0.125 | 0.4 | 1 | 1 | 1 | 1.5 | 2 |
| SIDE STEP AMOUNT (mm) | 8 | 8 | 8 | 0.5 | 1 | 1.5 | 0.5 | 0.5 |
| MOVEMENT SPEED (mm/min) | 360 | 750 | 2400 | 300 | 300 | 300 | 450 | 600 |
| PERIPHERAL SPEED (m/min) | 101 | 101 | 101 | 5 | 5 | 5 | 5 | 5 |
| RATIO (MOVEMENT SPEED / ROTATIONAL SPEED) | 0.18 | 0.375 | 1.2 | 3 | 3 | 3 | 4.5 | 6 |

FIG. 18

| | CONDITION 9 | CONDITION 10 | CONDITION 11 | CONDITION 12 | CONDITION 13 | CONDITION 14 | CONDITION 15 | CONDITION 16 |
|---|---|---|---|---|---|---|---|---|
| ROTATIONAL SPEED (rpm) | 100 | 100 | 100 | 100 | 200 | 200 | 300 | 900 |
| WORK AMOUNT / BLADE | 2.5 | 3 | 3.5 | 4 | 4 | 4 | 4 | 4 |
| SIDE STEP AMOUNT (mm) | 0.5 | 0.5 | 0.5 | 0.5 | 0.5 | 1 | 1 | 1 |
| MOVEMENT SPEED (mm/min) | 750 | 900 | 1050 | 1200 | 2400 | 2400 | 3600 | 10800 |
| PERIPHERAL SPEED (m/min) | 5 | 5 | 5 | 5 | 10 | 10 | 15 | 45 |
| RATIO (MOVEMENT SPEED / ROTATIONAL SPEED) | 7.5 | 9 | 10.5 | 12 | 12 | 12 | 12 | 12 |

FIG. 19

FORMED ARTICLE PRODUCING METHOD

The present application is based on, and claims priority from JP Application Serial Number 2022-091459, filed Jun. 6, 2022, the disclosure of which is hereby incorporated by reference herein in its entirety.

BACKGROUND

1. Technical Field

The present disclosure relates to a formed article producing method.

2. Related Art

There is known a shaping apparatus that shapes a three dimensional shaped object by ejecting a plasticized material toward a stage and curing the material.

For example, JP-A-2022-10642 describes a shaping apparatus for shaping a second formed article by cutting a first formed article to form recycling material, plasticizing the recycling material in a plasticizing section, and shaping the second formed article using the plasticized recycling material.

However, when the recycling material is produced by cutting, the recycling material may have a spiral shape. When the recycling material has a spiral shape, the recycling material interferes with itself to cause a bridge phenomenon in which new recycling material is not supplied to the plasticizing section, and the recycling material cannot be stably plasticized in some cases.

SUMMARY

An aspect of formed article producing method according to the present disclosure is
- a first step of shaping a shaping body by ejecting a shaping material including a thermoplastic resin and of forming a first formed article by cutting the shaping body with a first rotating tool;
- a second step of generating recycling material by cutting the first formed article with a second rotating tool; and
- a third step of forming a second formed article by ejecting the recycling material that was plasticized, wherein
- in the second step, the first formed article is cut under at least one condition of a condition that a moving speed of the second rotating tool is faster than a moving speed of the first rotating tool in the first step or a condition that a rotating speed of the second rotating tool is slower than a rotating speed of the first rotating tool in the first step.

BRIEF DESCRIPTION OF THE DRAWINGS

FIG. 18 is a table showing cutting conditions in the example experiment.

FIG. 19 is a table showing cutting conditions in the example experiment.

DESCRIPTION OF EMBODIMENTS

Hereinafter, preferred embodiments of the present disclosure will be described in detail with reference to the drawings. Note that the embodiments described below do not unduly limit the contents of the present disclosure described in the claims. All of the configurations described below are not necessarily essential constituent elements of the present disclosure.

1. SHAPED ARTICLE RECYCLING SYSTEM

1.1. Overall Configuration

Figure 1:
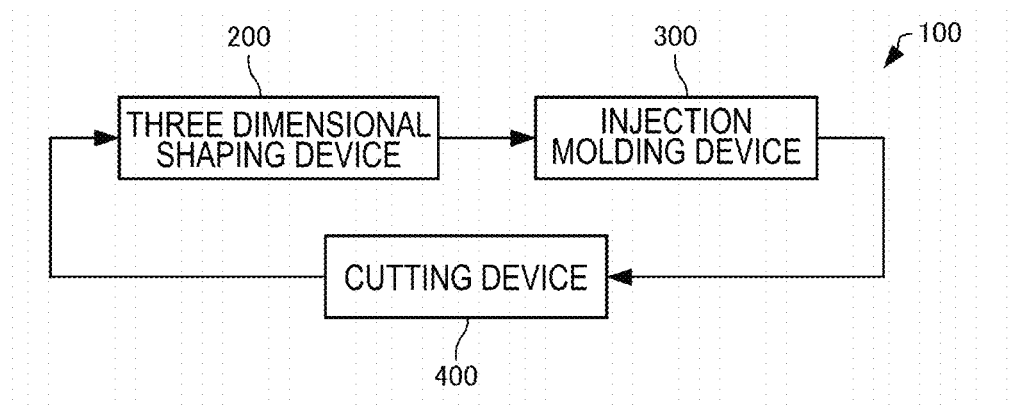
FIG. 1 is a functional block diagram of a shaped article recycling system according to an embodiment.

First, a shaped article recycling system according to the present embodiment will be described with reference to the drawings. FIG. 1 is a functional block diagram of a shaped article recycling system 100 according to an embodiment.

As shown in FIG. 1, the shaped article recycling system 100 includes, for example, a three dimensional shaping device 200, an injection molding device 300, and a cutting device 400.

The three dimensional shaping device 200 shapes a first formed article from a shaping material. The first formed article is used as, for example, at least a portion of a mold of the injection molding device 300. The arrows in FIG. 1 indicate the flow of the shaping material constituting the formed article.

The injection molding device 300 performs injection molding using the first formed article as a mold. When the first formed article is repeatedly used, the first formed article deteriorates. A deteriorated first formed article is removed from the injection molding device 300.

The cutting device 400 cuts a first formed article 10 removed from the injection molding device 300. When the first formed article 10 is cut, cutting chips are generated.

The three dimensional shaping device 200 plasticizes and ejects the generated cutting chips as a recycling material, and shapes a second formed article. The second formed article is used as, for example, at least a portion of a mold of the injection molding device 300.

As described above, the shaped article recycling system 100 can recycle the formed article. Hereinafter, each device will be described in order.

1.2. Three Dimensional Shaping Device

Figure 2:
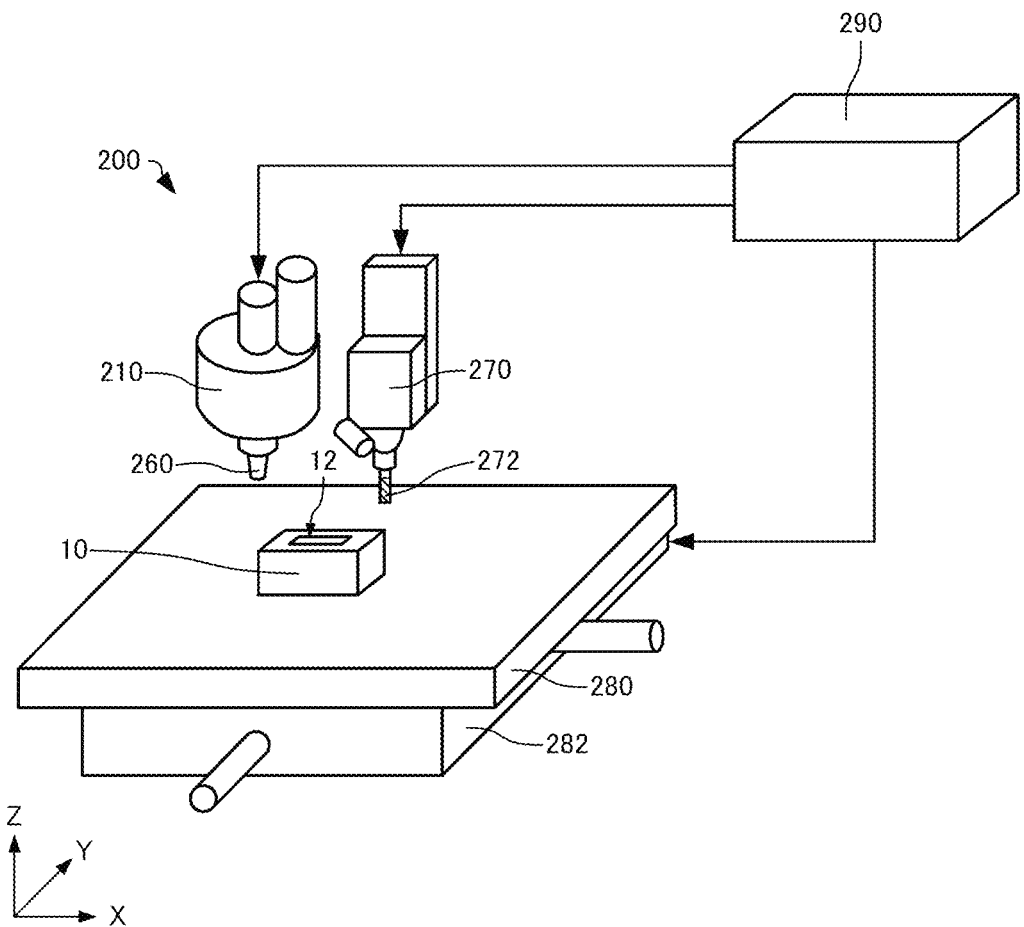
FIG. 2 is a perspective view schematically showing a three dimensional shaping device of the shaped article recycling system according to the embodiment.

FIG. 2 is a perspective view schematically showing the three dimensional shaping device 200 of the shaped article recycling system 100. In FIG. 2, an X axis, a Y axis, and a Z axis are shown as three axes orthogonal to each other. The X-axis direction and the Y-axis direction are, for example, horizontal directions. The Z-axis direction is, for example, a vertical direction.

As shown in FIG. 2, the three dimensional shaping device 200 includes, for example, a shaping unit 210, a cutting unit 270, a stage 280, a position changing section 282, and a control section 290.

The three dimensional shaping device 200 drives the position changing section 282 to change the relative position between the nozzle 260 and the stage 280 while ejecting plasticized shaping material from the nozzle 260 of the shaping unit 210 to the stage 280. Accordingly, the shaping unit 210 shapes a shaping body on the stage 280.

Further, the three dimensional shaping device 200 drives the position changing section 282 to change the relative position between a first rotating tool 272 and the stage 280 while rotating the first rotating tool 272 of the cutting unit 270. The cutting unit 270 cuts the shaping body formed on the stage 280. In this manner, the three dimensional shaping device 200 shapes the formed article 10 having a desired shape. The shaping body is an article in a state before the cavity 12 of the formed article 10 is formed.

Figure 3:
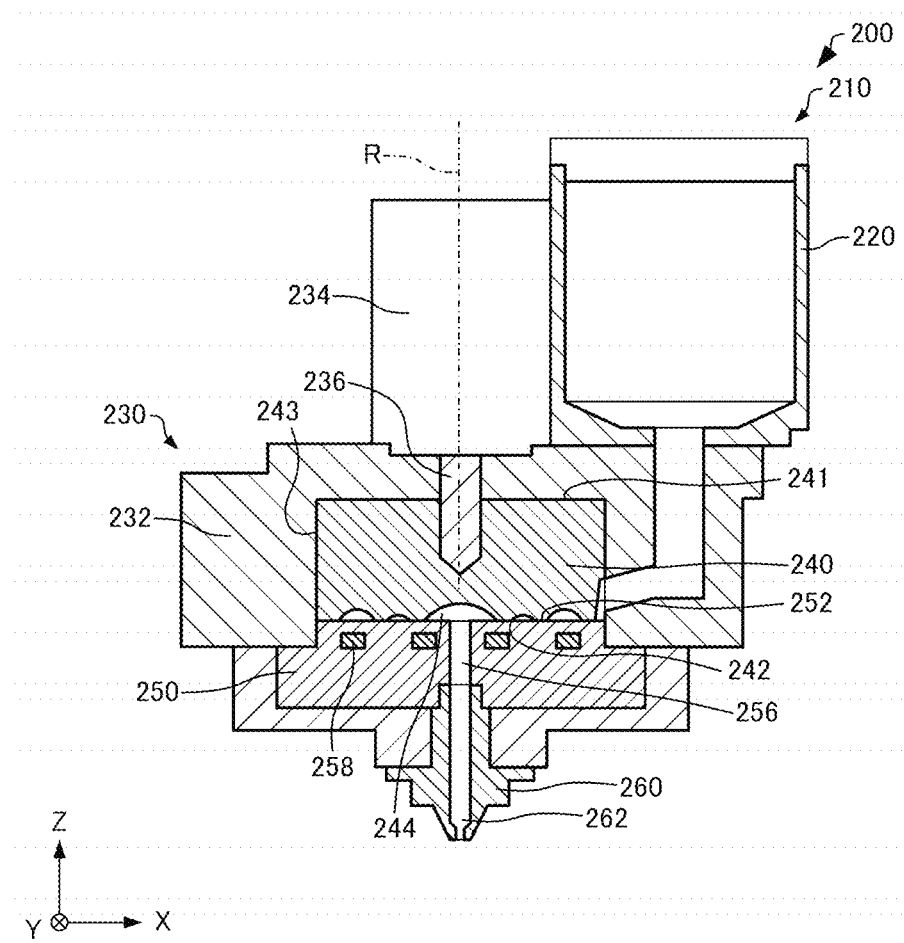
FIG. 3 is a cross-sectional view schematically showing an ejection unit of the shaped article recycling system according to the embodiment.

FIG. 3 is a cross-sectional view schematically showing the shaping unit 210. As shown in FIG. 3, the shaping unit 210 includes, for example, a material supply section 220, a plasticizing section 230, and a nozzle 260.

The material supply section 220 supplies the shaping material to the plasticizing section 230. The shape of the shaping material supplied by the material supply section 220 is, for example, a pellet shape or a powder shape. The material supply section 220 includes, for example, a hopper.

The plasticizing section 230 includes, for example, a screw case 232, a drive motor 234, a flat screw 240, a barrel 250, and a heater 258. The plasticizing section 230 plasticizes at least a portion of the shaping material supplied in a solid state from the material supply section 220, generates a paste-like shaping material having fluidity, and supplies the shaping material to the nozzle 260.

Plasticization is a concept including melting, and is to change from a solid state to a state having fluidity. Specifically, in the case of a material in which glass transition occurs, plasticization means that the temperature of the material is set to be equal to or higher than the glass transition point. In the case of a material that does not undergo glass transition, plasticization refers to raising the temperature of the material above its melting point.

The screw case 232 is a housing that accommodates the flat screw 240. A barrel 250 is provided on the lower surface of the screw case 232. The flat screw 240 is housed in a space surrounded by the screw case 232 and the barrel 250.

The drive motor 234 is provided on an upper surface of the screw case 232. The drive motor 234 is, for example, a servo motor. The shaft 236 of the drive motor 234 is connected to the upper surface 241 of the flat screw 240. The drive motor 234 is controlled by the control section 290. Although not illustrated, the shaft 236 of the drive motor 234 and the upper surface 241 of the flat screw 240 may be connected to each other via a speed reducer.

The flat screw 240 has a substantially cylindrical shape in which the size in the direction of a rotation axis R is smaller than the size in the direction orthogonal to the direction of the rotation axis R. In the illustrated example, the rotation axis R is parallel to the Z-axis. The torque generated by the drive motor 234 causes the flat screw 240 to rotate about the rotation axis R.

Figure 4:
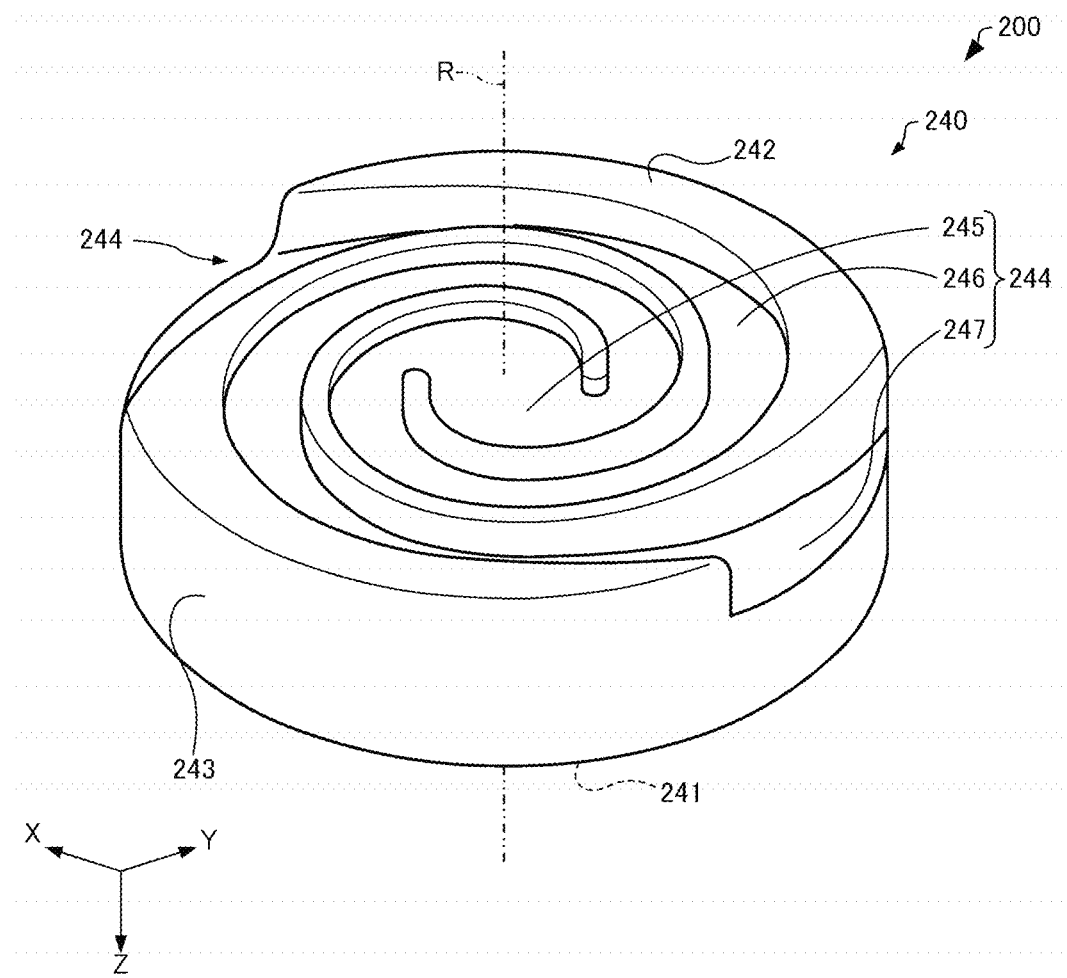
FIG. 4 is a perspective view schematically showing a flat screw of the shaped article recycling system according to the embodiment.

The flat screw 240 has an upper surface 241, a groove forming surface 242 on the opposite side from the upper surface 241, and a side surface 243 connecting the upper surface 241 and the groove forming surface 242. A first groove 244 is formed in the groove forming surface 242. The side surface 243 is, for example, perpendicular to the groove forming surface 242. FIG. 4 is a perspective view schematically showing the flat screw 240. For convenience sake, FIG. 4 shows a state in which the vertical positional relationship is reversed from that shown in FIG. 3.

As shown in FIG. 4, a first groove 244 is formed in the groove forming surface 242 of the flat screw 240. The first groove 244 includes, for example, a central section 245, a coupling section 246, and a material introduction section 247. The central section 245 faces a communication hole 256 formed in the barrel 250. The central section 245 communicates with the communication hole 256. The coupling section 246 connects the central section 245 and the material introduction section 247. In the illustrated example, the coupling section 246 is provided in a spiral shape from the central section 245 toward the outer periphery of the groove forming surface 242. The material introduction section 247 is provided on the outer periphery of the groove forming surface 242. That is, the material introduction section 247 is provided on the side surface 243 of the flat screw 240. The material supplied from the material supply section 220 is introduced from the material introduction section 247 into the first groove 244, passes through the coupling section 246 and the central section 245, and is conveyed to the communication hole 256 formed in the barrel 250. For example, two first grooves 244 are provided.

Note that the number of first grooves 244 is not particularly limited. Although not illustrated, three or more first grooves 244 may be provided, or only one first groove may be provided.

Figure 5:
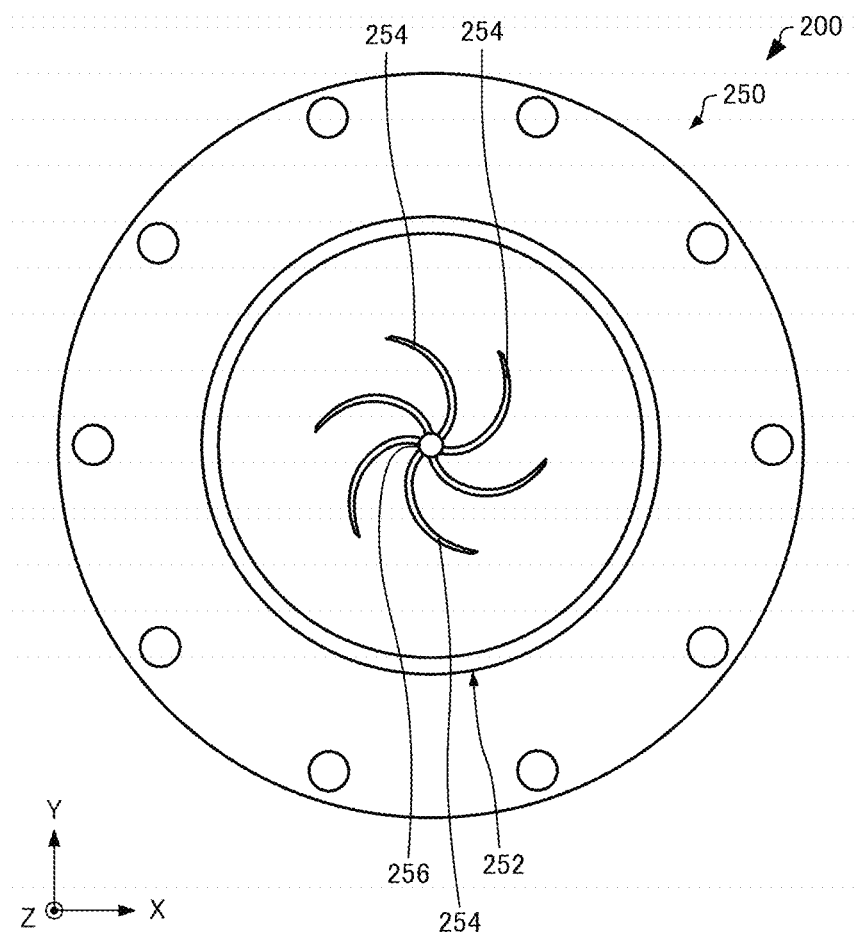
FIG. 5 is a plan view schematically showing a barrel of the shaped article recycling system according to the embodiment.

As shown in FIG. 3, the barrel 250 is provided below the flat screw 240. The barrel 250 has a facing surface 252 that faces the groove forming surface 242 of the flat screw 240. The communication hole 256 communicating with the first groove 244 is formed at the center of the facing surface 252. FIG. 5 is a plan view schematically showing the barrel 250.

As shown in FIG. 5, second grooves 254 and the communication hole 256 are formed in the facing surface 252 of the barrel 250. A plurality of second grooves 254 are formed. In the illustrated example, six second grooves 254 are formed, but the number of second grooves 254 is not particularly limited. The plurality of second grooves 254 is formed around the communication hole 256 as viewed in the Z-axis direction. The second grooves 254 have one end connected to the communication hole 256, and spirally extend from the communication hole 256 toward the outer periphery of the barrel 250. The second grooves 254 have a function of guiding the plasticized shaping material to the communication hole 256.

The shape of the second grooves 254 is not particularly limited, and may be, for example, linear. Further, one end of the second grooves 254 may not be connected to the communication hole 256. Further, the second grooves 254 may not be formed in the facing surface 252. However, in consideration of efficiently guiding the plasticized shaping material to the communication hole 256, it is desirable that the second grooves 254 be formed in the facing surface 252.

As shown in FIG. 3, the heater 258 is provided in the barrel 250. The heater 258 heats the material supplied between the flat screw 240 and the barrel 250. The heater 258 is controlled by the control section 290. By using the flat screw 240, the barrel 250, and the heater 258, the plasticizing section 230 generates plasticized shaping material by heating the shaping material while conveying the shaping material toward the communication hole 256, and causes the generated shaping material to flow out from the communication hole 256. The heater 258 may have a ring shape as viewed in the Z-axis direction.

The heater 258 may not be provided in the barrel 250, and may be provided in the flat screw 240, for example. Although not illustrated, instead of the flat screw 240, the plasticizing section 230 may plasticize the shaping material using an in-line screw that is elongated in the rotation axis direction.

The nozzle 260 is provided below the barrel 250. A nozzle aperture 262 is formed in the nozzle 260. The nozzle aperture 262 communicates with the communication hole 256. The shaping material is supplied to the nozzle aperture 262 from the communication hole 256. The nozzle 260 ejects the plasticized shaping material from the nozzle aperture 262 toward the stage 280. Accordingly, the shaping unit 210 shapes a shaping body on the stage 280.

As shown in FIG. 2, the cutting unit 270 rotates the first rotating tool 272 attached to the tip end on the stage 280 side to shape the shaping body that was shaped on the stage 280. For example, the cutting unit 270 cuts the shaping body to shape the formed article 10 having the cavity 12. The first rotating tool 272 is rotatable about an axis parallel to the Z-axis. For example, a flat end mill or a ball end mill is used as the first rotating tool 272. The control section 290 controls the position changing section 282 to control the cutting position by changing the relative position between the first rotating tool 272 and the shaping body that was formed on the stage 280.

The formed article 10 is disposed on the stage 280. In the illustrated example, the formed article 10 is provided directly on the stage 280. Although not shown, the formed article 10 may be provided on the stage 280 via a predetermined plate.

The position changing section 282 supports the stage 280. In the illustrated example, the position changing section 282 is configured as a three axis positioner that moves the stage 280 with respect to the shaping unit 210 and the cutting unit 270, along three axes, which are orthogonal to each other.

The position changing section 282 may move the shaping unit 210 and the cutting unit 270 with respect to the stage 280 without the stage 280 moving. The position changing section 282 may move both the stage 280, and the shaping unit 210 and the cutting unit 270. For example, the position changing section 282 may move the stage 280 in the X-axis direction and the Y-axis direction, and may move the shaping unit 210 and the cutting unit 270 in the Z-axis direction.

The position changing section 282 may have a function of inclining the stage 280 with respect to a horizontal plane. The position changing section 282 may have a function of inclining the nozzle 260 and the first rotating tool 272 with respect to a horizontal plane.

The control section 290 is configured by, for example, a computer including a processor, a main storage device, and an input/output interface that performs input and output of signals with the outside. The control section 290, for example, controls the shaping unit 210, the cutting unit 270, and the position changing section 282 by causing the processor to execute a program read into the main storage device. The control section 290 may be configured by a combination of a plurality of circuits instead of the computer.

Figure 6:
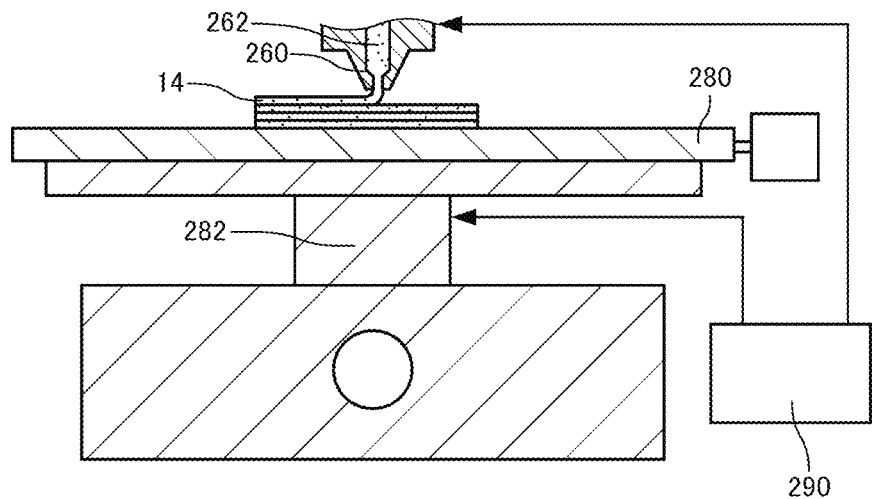
FIG. 6 is a cross-sectional view schematically showing a production step of a shaped article in the three dimensional shaping device of the shaped article recycling system according to the embodiment.

Here, FIG. 6 is a cross-sectional view schematically showing a production step of the formed article 10 in the three dimensional shaping device 200.

As illustrated in FIG. 6, the control section 290 causes the plasticized shaping material to be ejected from the nozzle 260 while changing the position of the nozzle 260 with respect to the stage 280 in a direction along the upper surface of the stage 280 while maintaining the distance between the stage 280 and the nozzle 260. The shaping material ejected from the nozzle 260 is continuously deposited on the stage 280 in the movement direction of the nozzle 260 to form a layer 14.

The control section 290 repeats the scanning of the nozzle 260 to form a plurality of layers 14. Specifically, after one layer 14 is formed, the control section 290 moves the position of the nozzle 260 upward with respect to the stage 280. Then, a layer 14 is further stacked on the layers 14 formed up to now, to shape the formed article 10 composed of a plurality of layers 14. The formed article 10 is a laminate comprising a plurality of layers 14.

For example, in a case where the nozzle 260 is moved upward after the layer 14 corresponding to one layer is deposited or in a case where a discontinuous path is shaped, the control section 290 may temporarily interrupt the ejection of the shaping material from the nozzle 260. In this case, the control section 290 controls a butterfly valve or the like (not shown) provided in the nozzle aperture 262 to stop ejection of the shaping material from the nozzle 260. After changing the position of the nozzle 260, the control section 290 opens the butterfly valve to restart ejection of the shaping material, thereby restarting deposition of the shaping material from the changed position of the nozzle 260.

1.3. Injection Molding Device

Figure 7:
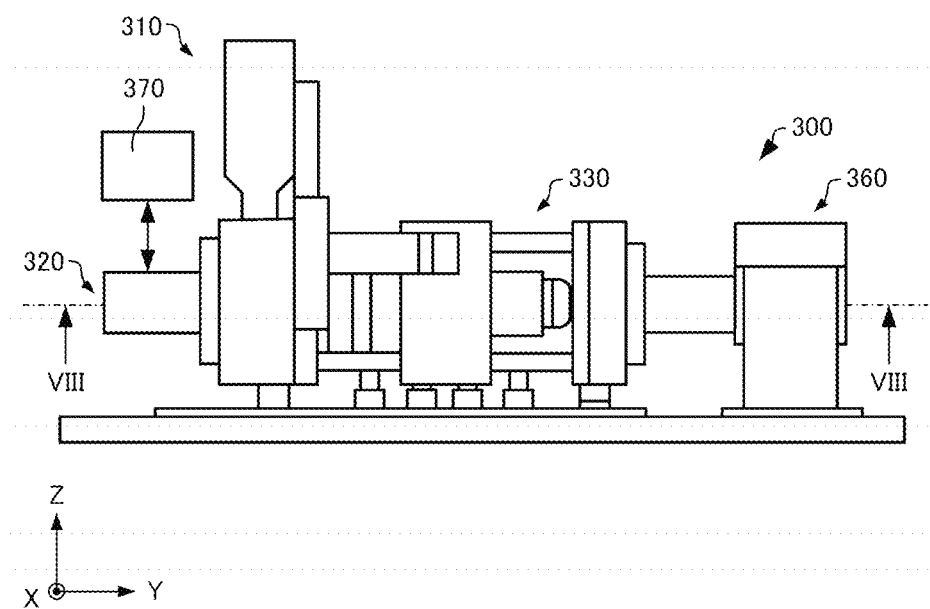
FIG. 7 is a side view schematically showing an injection molding device of the shaped article recycling system according to the embodiment.

FIG. 7 is a side view schematically showing the injection molding device 300 of the shaped article recycling system 100. The injection molding device 300 uses, for example, the formed article 10 shaped by the three dimensional shaping device 200 as a portion of a movable mold 342.

As shown in FIG. 7, the injection molding device 300 includes, for example, a material supply section 310, an injection section 320, a mold section 330, a mold clamping section 360, and a control section 370.

The material supply section 310 supplies a material serving as a raw material to the injection section 320. The material supply section 310 is constituted by, for example, a hopper. The shape of the material supplied from the material supply section 310 is, for example, a pellet shape or a powder shape. Examples of the material supplied from the material supply section 310 include acrylonitrile-butadiene-styrene (ABS) resin, polyphenylene sulfide (PPS), and a material obtained by adding metal particles to these resins.

The injection section 320 plasticizes the material supplied from the material supply section 310 into a plasticized material. Then the injection section 320 injects the plasticized material toward the mold section 330.

A cavity corresponding to the shape of a formed article is formed in the mold section 330. The material injected from the injection section 320 flows into the cavity. The plasticized material is then cooled and solidified to produce a formed article.

The mold clamping section 360 opens and closes the mold of the mold section 330. The mold clamping section 360 opens the mold of the mold section 330 after the plasticized material has cooled and solidified. By this, the formed article is ejected out.

The control section 370 is configured by, for example, a computer including a processor, a main storage device, and an input/output interface that performs input and output of signals with the outside. The control section 370 exhibits various functions by, for example, causing the processor to execute programs read into the main storage device. Specifically, the control section 370 controls the injection section 320 and the mold clamping section 360. The control section 370 may be configured by a combination of a plurality of circuits instead of the computer.

Figure 8:
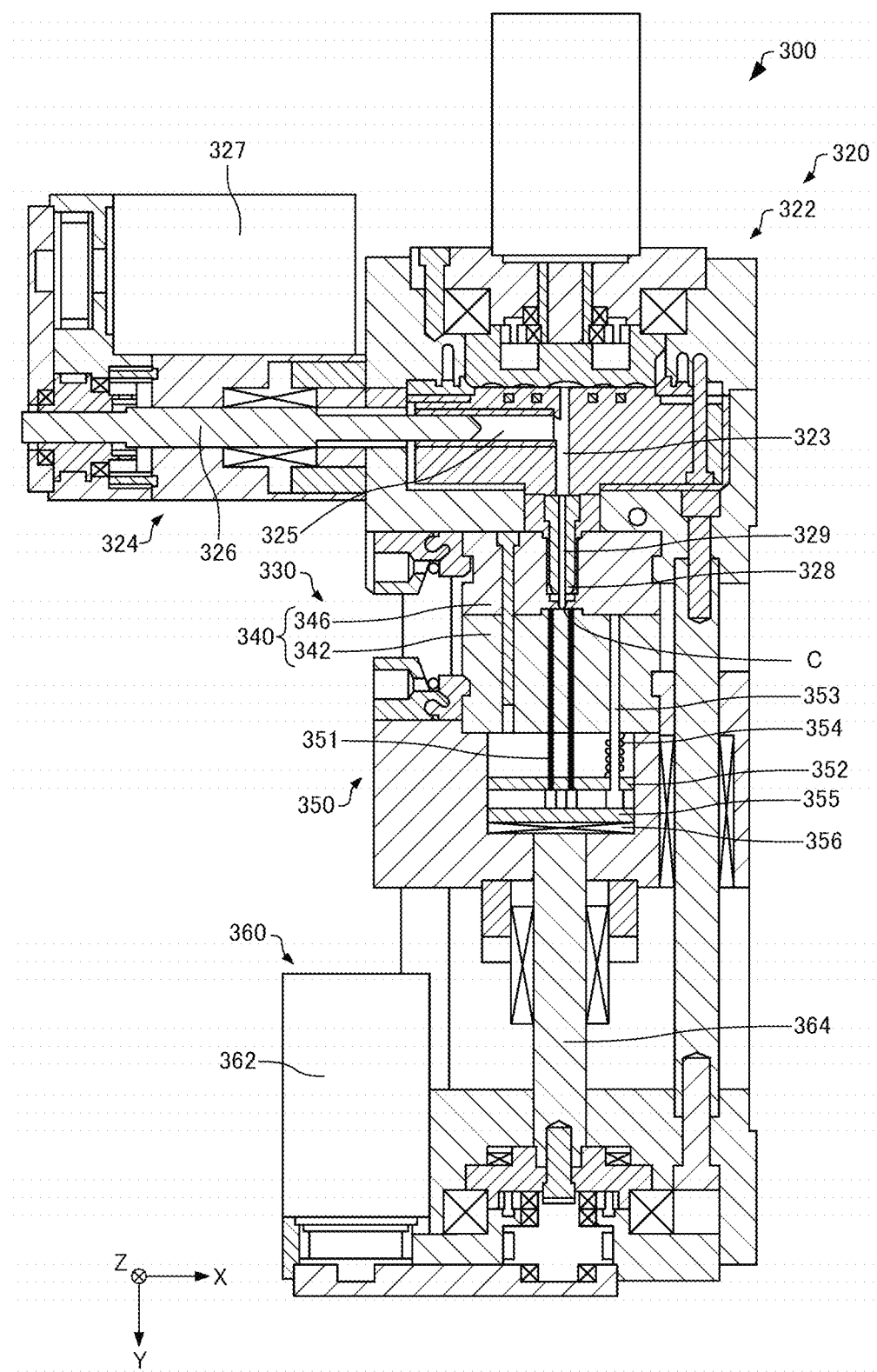
FIG. 8 is a cross-sectional view schematically showing the injection molding device of the shaped article recycling system according to the embodiment.

FIG. 8 is a cross-sectional view taken along the VIII-VIII line of FIG. 7, schematically showing the injection molding device 300. As shown in FIG. 8, the injection section 320 includes, for example, a plasticizing section 322, an injection mechanism 324, and a nozzle 328.

The plasticizing section 322 is configured to plasticize the material supplied from the material supply section 310 into a paste-like material having fluidity and to guide the paste-like material to the injection mechanism 324. The configuration and function of the plasticizing section 322 are basically the same as those of the plasticizing section 230 of the three dimensional shaping device 200 described above. That is, the plasticizing section 322 includes a drive motor, a flat screw, a barrel, and a heater.

The injection mechanism 324 includes, for example, a side cylinder 325, a plunger 326, and a plunger drive section 327. The cylinder 325 is a substantially cylindrical member connected to the communication hole 323 of the plasticizing section 322. The plunger 326 moves inside the cylinder 325. The plunger 326 is driven by the plunger drive section 327, which includes a motor, a gear, and the like. The plunger drive section 327 is controlled by the control section 370. The cylinder 325 may be connected to a flow path downstream of the communication hole 323.

The injection mechanism 324 performs a measuring operation and an injection operation by sliding the plunger 326 in the cylinder 325. The measuring operation refers to an operation of introducing the plasticized material located in the communication hole 323 into the cylinder 325 by moving the plunger 326 in the −X-axis direction away from the communication hole 323 and measuring the material in the cylinder 325. The injection operation refers to an operation of injecting the plasticized material in the cylinder 325 into the mold section 330 through the nozzle 328 by moving the plunger 326 in the +X-axis direction approaching the communication holes 323.

A nozzle aperture 329 communicating with the communication hole 323 is formed in the nozzle 328. The nozzle 328 injects the material supplied from the plasticizing section 322 toward the mold 340 of the mold section 330. To be specific, by performing the above-described measurement operation and injection operation, the material measured in the cylinder 325 is sent from the injection mechanism 324 to the nozzle aperture 329 via the communication hole 323. Then, the material is injected from the nozzle aperture 329 into the mold 340.

Figure 9:
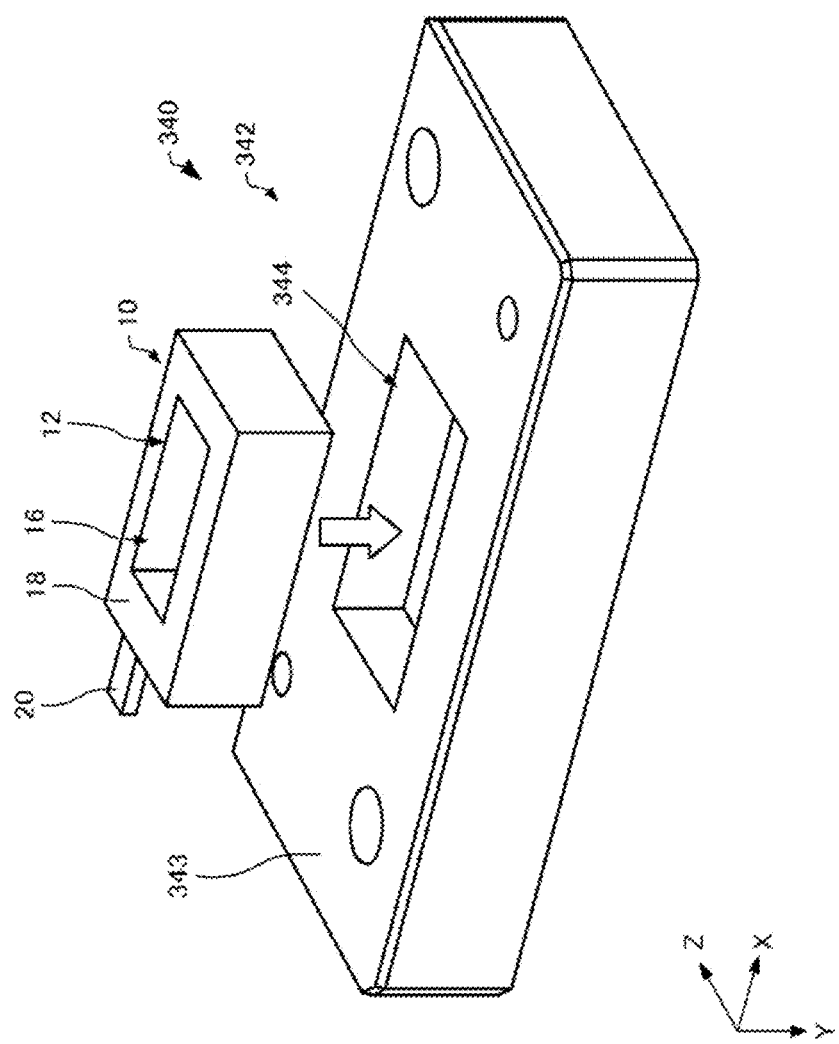
FIG. 9 is an exploded perspective view schematically showing a mold of the shaped article recycling system according to the embodiment.

The mold section 330 includes a mold 340 and an extrusion mechanism 350. The material sent to the nozzle aperture 329 is injected from the nozzle aperture 329 into the cavity 12 of the mold 340. Specifically, the mold 340 has a movable mold 342 and a fixed mold 346 that face each other, and has a cavity 12 between the movable mold 342 and the fixed mold 346. The cavity 12 is a space corresponding to the shape of a formed article to be molded by the injection molding device 300. FIG. 9 is an exploded perspective view schematically showing the movable mold 342 of the mold 340.

As shown in FIG. 9, the movable mold 342 of the mold 340 includes, for example, the formed article 10 and a mother mold 343. The formed article 10 is molded by the three dimensional shaping device 200 described above. The formed article 10 is a core. The formed article 10 has a first portion 16 configuring the cavity 12 and a second portion 18 that does not configure the cavity 12. The first portion 16 is the surface of formed article 10 that defines cavity 12. A test piece 20 is connected to the formed article 10. The test piece 20 is provided integrally with the formed article 10. The test piece 20 is, for example, a test piece for a tensile test, a compression test, or the like. For convenience, the test piece 20 is not shown in FIG. 2.

As shown in FIG. 9, the movable mold 342 of the mold 340 is formed by fitting the formed article 10 into a recess section 344 formed in the mother mold 343. Before the formed article 10 is fitted into the recess section 344, the test piece 20 is broken off from the formed article 10. The material of the mother mold 343 is, for example, metal. Although not shown, the test piece 20 may be provided separately from the formed article 10. In this case, the work of breaking off the test piece 20 from the formed article 10 can be omitted.

As shown in FIG. 8, the extrusion mechanism 350 is provided in the movable mold 342. The extrusion mechanism 350 releases a formed article that was molded by the injection molding device 300 from the mold 340. The extrusion mechanism 350 includes, for example, an ejector pin 351, a support plate 352, a support rod 353, a spring 354, an extrusion plate 355, and a thrust bearing 356.

The ejector pin 351 is a rod-shaped member for pushing out the formed article that was molded in the cavity 12. The ejector pin 351 is provided so as to be inserted through the movable mold 342 and up to the cavity 12.

The support plate 352 is a plate member that supports the ejector pin 351. The ejector pin 351 is fixed to the support plate 352. The support rod 353 is fixed to a support plate 352. The support rod 353 is inserted into a through hole formed in the movable mold 342.

The spring 354 is disposed in a space between the movable mold 342 and the support plate 352. The support rod 353 is inserted into the spring 354. During molding, the spring 354 urges the support plate 352 so that the head of the ejector pin 351 forms a portion of the wall surface of the cavity 12.

The extrusion plate 355 is fixed to the support plate 352. The thrust bearing 356 is attached to the extrusion plate 355. The thrust bearing 356 is provided so that the head section of a ball screw section 364 does not damage the extrusion plate 355. Instead of the thrust bearing 356, a thrust sliding bearing or the like may be used.

The mold clamping section 360 includes, for example, a mold drive section 362 and the ball screw section 364. The mold drive section 362 is configured by, for example, a motor, a gear, and the like. The mold drive section 362 is connected to the movable mold 342 via the ball screw section 364. The mold drive section 362 is controlled by the control section 370. The ball screw section 364 transmits power generated by driving of the mold drive section 362 to the movable mold 342. The mold clamping section 360 opens and closes the mold 340 by using the mold drive section 362 and the ball screw section 364 to move the movable mold 342.

1.4. Cutting Device

Figure 10:
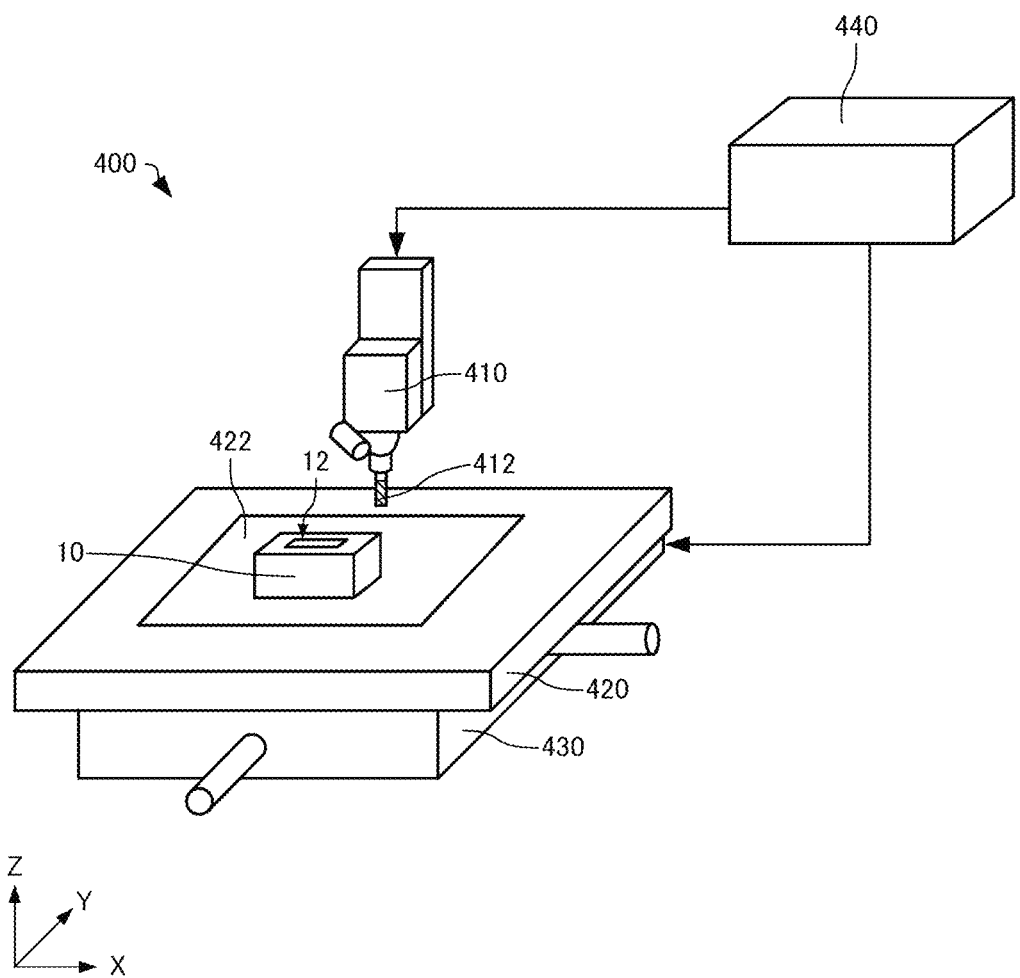
FIG. 10 is a perspective view schematically showing a cutting device of the shaped article recycling system according to the embodiment.

FIG. 10 is a perspective view schematically showing the cutting device 400 of the shaped article recycling system 100. The cutting device 400 cuts the formed article 10 that was used as a portion of the movable mold 342 in the injection molding device 300, and generates a recycling material to be recycled as shaping material of the three dimensional shaping device 200.

As shown in FIG. 10, the cutting device 400 includes, for example, a cutting unit 410, a stage 420, a position changing section 430, and a control section 440.

Figure 11:
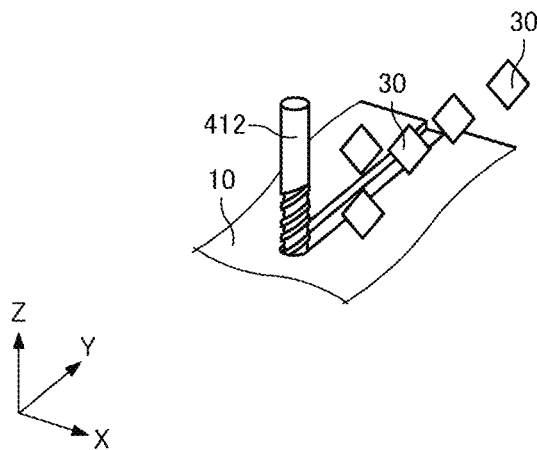
FIG. 11 is a view for explaining cutting of a shaped article by a rotating tool of the shaped article recycling system according to the embodiment.

The cutting device 400 drives the position changing section 430 while rotating the second rotating tool 412 of the cutting unit 410 to change the relative position between the second rotating tool 412 and the stage 420. As shown in FIG. 11, the cutting unit 410 cuts the formed article 10 formed on the stage 420. By this, the cutting unit 410 produces recycling material 30. The recycling material 30 is cutting chips from the formed article 10. In the illustrated example, the recycling material 30 is in the form of pellets. FIG. 11 is a view for explaining how the formed article 10 is cut by the second rotating tool 412 of the cutting device 400.

Figure 12:
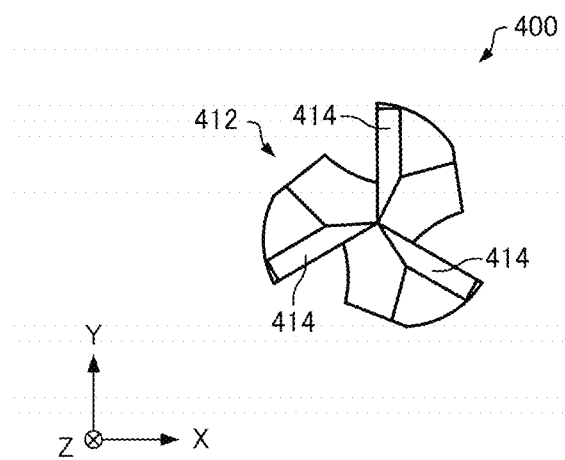
FIG. 12 is a bottom view schematically showing the rotating tool of the shaped article recycling system according to the embodiment.
Figure 13:
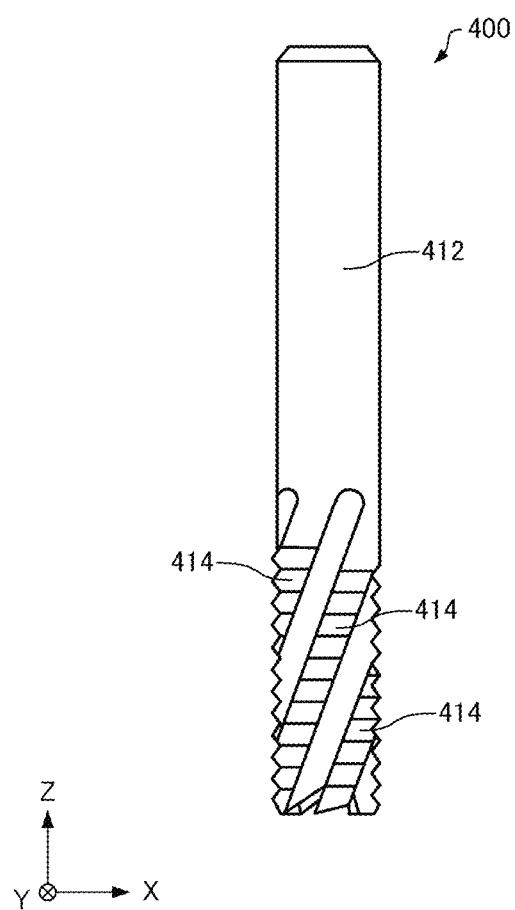
FIG. 13 is a side view schematically showing the rotating tool of the shaped article recycling system according to the embodiment.

Here, FIG. 12 is a bottom view schematically showing the second rotating tool 412. FIG. 13 is a side view schematically showing the second rotating tool 412.

As shown in FIG. 12, the second rotating tool 412 has, for example, a plurality of blades 414. In the illustrated example, the second rotating tool 412 has three blades 414. As shown in FIG. 13, the second rotating tool 412 has a roughening structure in which concave and convex sections are formed on surfaces of blades 414. In the illustrated example, the second rotating tool 412 is a three bladed roughing end mill. The first rotating tool 272 of the three dimensional shaping device 200 described above may have the same shape as the second rotating tool 412.

As shown in FIG. 10, the formed article 10 is disposed on the stage 420. In the illustrated example, the formed article 10 is provided directly on the stage 420. The stage 420 includes a magnetic section 422. In the illustrated example, the formed article 10 is provided on the magnetic section 422. The magnetic section 422 is formed of, for example, a neodymium magnet. When the formed article 10 includes metal particles, the magnetic section 422 uses magnetic force to recover the metal particles of the recycling material 30 that were generated from the formed article 10.

The configuration and function of the position changing section 430 are basically the same as those of the position changing section 282 of the three dimensional shaping device 200 described above. The configuration and function of the control section 440 are basically the same as those of the control section 290 of the three dimensional shaping device 200 described above.

2. METHOD FOR PRODUCING SHAPED ARTICLE

2.1. Overall Flow

Figure 14:
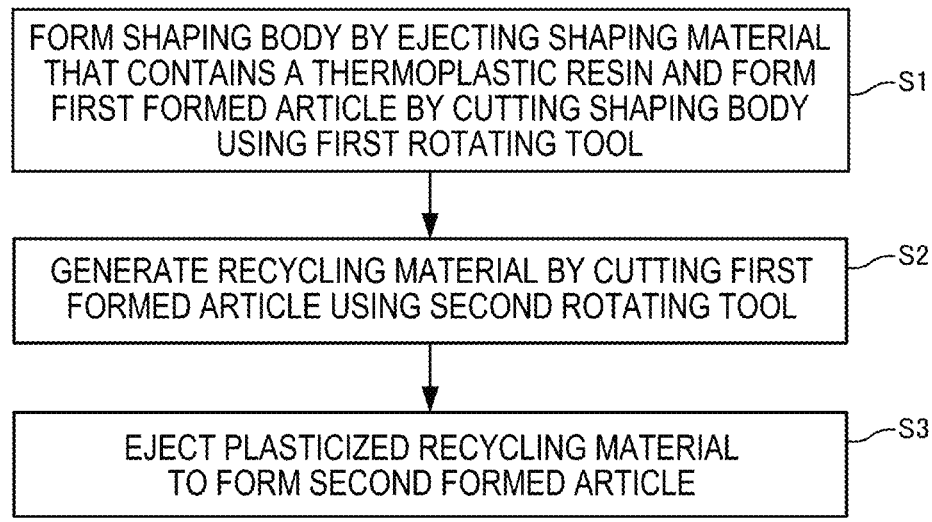
FIG. 14 is a flowchart for explaining the manufacturing method of the shaped article according to the embodiment.

FIG. 14 is a flowchart for explaining the manufacturing method of the shaped article according to the present embodiment.

As shown in FIG. 14, the method for manufacturing a shaped article according to the present embodiment includes as step S1 a first step of forming a shaping body by ejecting a shaping material that contains a thermoplastic resin and forming a first formed article by cutting the shaping body using the first rotating tool 272, a second step as step S2 of generating recycling material by cutting the first formed article using the second rotating tool 412, and a third step as step S3 of ejecting plasticized recycling material to form a second formed article. Each step will be described below.

2.2. First Step

In the first step, shaping material is ejected to shape a shaping body by using the three dimensional shaping device 200 of the shaped article recycling system 100 shown in FIG. 2. Then, the shaping body is cut by the first rotating tool 272 of the three dimensional shaping device 200 to form the first formed article. To be specific, the control section 290 of the three dimensional shaping device 200 rotates the first rotating tool 272 by controlling the driving section that rotates the first rotating tool 272. Further, the control section 290 controls the position changing section 282 to move the first rotating tool 272 with respect to the stage 280 and bring the first rotating tool 272 into contact with the shaping body to cut the shaping body.

The shaping material includes a thermoplastic resin. Examples of the thermoplastic resin include general-purpose engineering plastics and super engineering plastics.

Examples of the general-purpose engineering plastic include ABS resin, polypropylene (PP), polyethylene (PE), polyacetal (POM), polyvinyl chloride (PVC), polyamide (PA), polylactic acid (PLA), polycarbonate (PC), modified polyphenylene ether, polybutylene terephthalate, and polyethylene terephthalate.

Examples of the super engineering plastic include polysulfone (PSU), polyethersulfone (PES), PPS, polyarylate (PAR), polyimide (PI), polyamideimide (PAI), polyetherimide (PEI), and polyether ether ketone (PEEK).

The shaping material may include metal particles. The metal particles contained in the shaping material are, for example, amorphous metal particles containing iron (Fe) as a main component. That is, the amorphous metal particles have an iron content of 70 mass % or more. In the amorphous metal particles, cobalt (Co), nickel (Ni), silicon (Si), boron (B), chromium (Cr), tungsten (W), niobium (Nb), tantalum (Ta), titanium (Ti), zirconium (Zr), hafnium (Hf), or the like may be added to the main component.

The amorphous metal particles contained in the shaping material have, for example, a spherical shape. The amorphous metal particles are formed by, for example, an atomization method. Spherical shaped amorphous metal particles can be obtained by the atomization method.

The content of the amorphous metal particles in the shaping material is, for example, 20% by volume or more and 40% by volume or less, preferably 30% by volume or more and 40% by volume or less, and more preferably 35% by volume or more and 40% by volume or less.

The amorphous metal particles included in the shaping material may be coated with a compatibilizer. The compatibilizer coated on the amorphous metal particles is, for example, a silane coupling agent. The material of the silane coupling agent is, for example, 3-mercaptopropyltrimethoxysilane.

2.3. Second Step

In the second step, the first formed article is cut with the second rotating tool 412 using the cutting device 400 of the shaped article recycling system 100 shown in FIG. 10 to generate recycling material. In the second step, for example, the first formed article that was used as a portion of the movable mold 342 of the injection molding device 300 of the shaped article recycling system 100 shown in FIG. 8 is cut.

In the second step, the first formed article is cut under a first condition in which the moving speed of the second rotating tool 412 is faster than the moving speed of the first rotating tool 272 in the first step. To be specific, the control section 440 of the cutting device 400 shown in FIG. 10 controls the position changing section 430 so that the moving speed of the second rotating tool 412 with respect to the stage 420 is faster than the moving speed of the first rotating tool 272 with respect to the stage 280 in the first step, and cuts the first formed article. The moving speed of the second rotating tool 412 in the second step is, for example, 1,200 ram/min or more and 10,800 mm/min or less.

In the second step, the first formed article is cut under a second condition in which the rotational speed of the second rotating tool 412 is slower than the rotational speed of the first rotating tool 272 in the first step. To be specific, the control section 440 controls the drive section that rotates the second rotating tool 412 to rotate the second rotating tool 412 so that the rotational speed of the second rotating tool 412 is slower than the rotational speed of the first rotating tool 272 in the first step. The rotational speed of the second rotating tool 412 is, for example, 100 rpm or more and 900 rpm or less.

In the second step, the first formed article is cut under at least one of the first condition or the second condition. That is, in the second step, the first formed article may be cut under the first condition and the second condition, the first formed article may be cut under the second condition without using the first condition, or the first formed article may be cut under the first condition without using the second condition.

In the second step, for example, the ratio of the moving speed (ram/min) of the second rotating tool 412 to the rotating speed (rpm) of the second rotating tool 412 is 12 or more. The ratio is, for example, 100 or less.

In the second step, a second portion 18 not constituting the cavity 12 of the formed article 10 is cut to generate recycling material 30. To be specific, the control section 440 controls the position changing section 430 to bring the second rotating tool 412 into contact with the second portion 18. For example, the first portion 16 defining the cavity 12 may be shaved by about 1 mm and recycling material may be produced by the remainder of the second portion 18.

When metal particles such as iron are included in the shaping material, the cutting chips of the first formed article are collected in the second step by the magnetic force of the magnetic section 422. Accordingly, it is possible to suppress scattering of cutting chips during cutting.

In the second step, the cutting unit 270 of the three dimensional shaping device 200 may be used instead of the cutting device 400 to cut the first formed article with the first rotating tool 272 to generate the recycling material. In this case, the rotating tool used in the first step and the rotating tool used in the second step are the same first rotating tool 272.

Alternatively, the recycling material may be obtained by using a crusher or an extruder to process the cutting chips produced in the second step.

2.4. Third Step

In the third step, the recycling material generated in the second step is plasticized using the three dimensional shaping device 200 shown in FIG. 2. Then, the plasticized recycling material is ejected to the stage 280 by using the three dimensional shaping device 200 to form the second formed article. The shape of the second formed article may be the same as or different from that of the first formed article. The material of the second formed article may be the same as or different from that of the first formed article.

In the third step, for example, the recycling material to which an additive has been added is plasticized and ejected. Examples of the additive include a plasticization accelerator and metal particles contained in the shaping material of the first step. The amount of the additive may be increased as the number of recycles of the formed article increases.

In the third step, a test piece integral with or separate from the second formed article is shaped.

Through the above steps, formed articles can be recycled. The number of recycles of formed articles is not particularly limited.

2.4. Effects

The formed article producing method includes the first step of forming a shaping body by ejecting shaping material containing a thermoplastic resin and forming a first formed article by cutting the shaping body with the first rotating tool 272, the second step of generating recycling material by cutting the first formed article with the second rotating tool 412, and the third step of ejecting plasticized recycling material to form a second formed article. In the second step, the first formed article is cut under at least one condition of a condition that the moving speed of the second rotating tool 412 is faster than the moving speed of the first rotating tool 272 in the first step or a condition that the rotating speed of the second rotating tool 412 is slower than the rotating speed of the first rotating tool 272 in the first step.

Therefore, in the formed article producing method, it is possible to reduce the possibility that the recycling material forms a spiral shape as shown in example experiments (to be described later). Accordingly, it is possible to reduce the possibility that while the recycling material is being plasticized that the recycling materials interfere with each other and a bridge phenomenon occurs, and the recycling materials can be stably plasticized.

In the formed article producing method, the second rotating tool 412 has the blade 414 with the roughing structure. Therefore, in the formed article producing method, it is possible to suppress the possibility of the recycling material becoming too long in the longitudinal direction. If the blade of the second rotating tool were not to have a roughing structure, a possibility would become higher that the recycling material would become too long in the longitudinal direction and a bridge phenomenon would occur when plasticizing the recycling material.

In the formed article producing method, in the second step, the ratio of the moving speed (ram/min) to the rotating speed (rpm) of the second rotating tool 412 is 12 or more. Therefore, in the formed article producing method, it is possible to reduce the possibility that the recycling material forms a spiral shape as shown in example experiments (to be described later).

In the formed article producing method, the shaping material includes amorphous metal particles with iron as the main component. Amorphous metals have lower thermal conductivity than metals and higher thermal conductivity than resins. Therefore, in the formed article producing method, it is possible to reduce heat that accumulates in the formed article and to shorten the cooling time of the formed article compared to a case where a shaping material made of a resin is used. Further, it is possible to form a formed article in which filling failure and warpage are less likely to occur than in a case where a shaping material made of metal is used.

In the formed article producing method, the amorphous metal particles have a spherical shape. Therefore, in the formed article producing method, it is possible to form a formed article having a smaller difference in elastic modulus between the first direction and the second direction, which are orthogonal to each other, as compared with a case where the amorphous metal particles are not spherically shape.

Furthermore, it is possible to increase the possibility that the size of the amorphous metal particles contained in the first formed article and the size of the amorphous metal particles contained in the second formed article, which used the recycling material, are the same. For example, in the case where the amorphous metal particles are fibrous, there is a high possibility that the amorphous metal particles would be cut in the second step and that the size of the amorphous metal particles contained in the second formed article would be smaller than the size of the amorphous metal particles contained in the first formed article.

In the formed article producing method, at least one of the first formed article or the second formed article is at least a portion of a mold 340 used in the injection molding device 300. Therefore, at least a portion of the mold 340 can be form by the formed article producing method.

In the formed article producing method, the first formed article is at least a portion of the mold 340 having the cavity 12, and in the second step, the second portion 18, which does not constitute the cavity 12 of the first formed article, is cut to generate recycling material. Therefore, in the formed article producing method, the recycling material can be produced without using a portion that was severely deteriorated by injection molding. Since the first portion 16 constituting the cavity 12 of the first formed article comes into contact with the high-temperature plasticized shaping material, the first portion 16 deteriorates more severely than the second portion 18.

In the third step of the formed article producing method, the recycling material to which an additive is added is plasticized and ejected. Therefore, in the formed article producing method, the components of the material constituting the second formed article can be more similar to the components of the material constituting the first formed article.

In the formed article producing method, a test piece 20 integrated with or separate from a second formed article is shaped. Therefore, by testing the test piece 20 in the formed article producing method, it is possible to investigate whether or not the physical properties of the second formed article deviate from the physical properties of the first formed article.

In the formed article producing method, the shaping material contains metal particles, and in the second step, the cutting chips of the first formed article are recovered by magnetic force. Therefore, it is possible to suppress scattering of cutting chips during cutting.

3. EXAMPLE EXPERIMENT 3.1. Experimental Conditions

Figure 15:
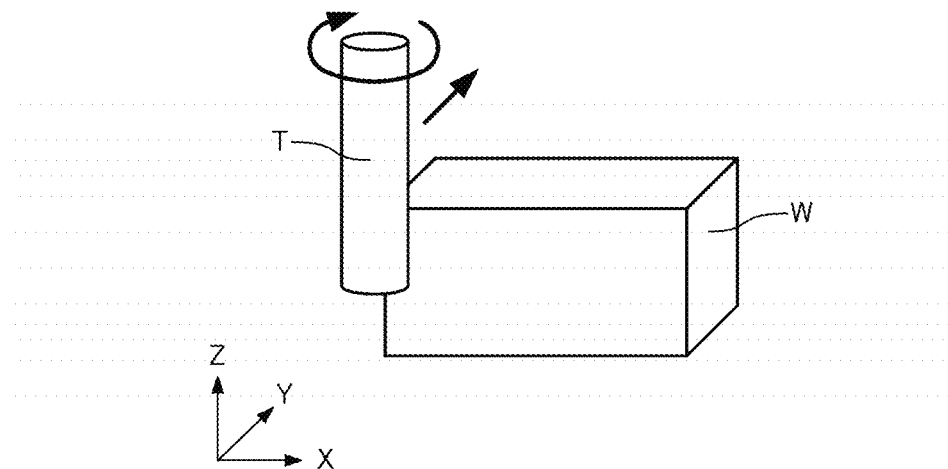
FIG. 15 is a perspective view for explaining an example experiment.
Figure 16:
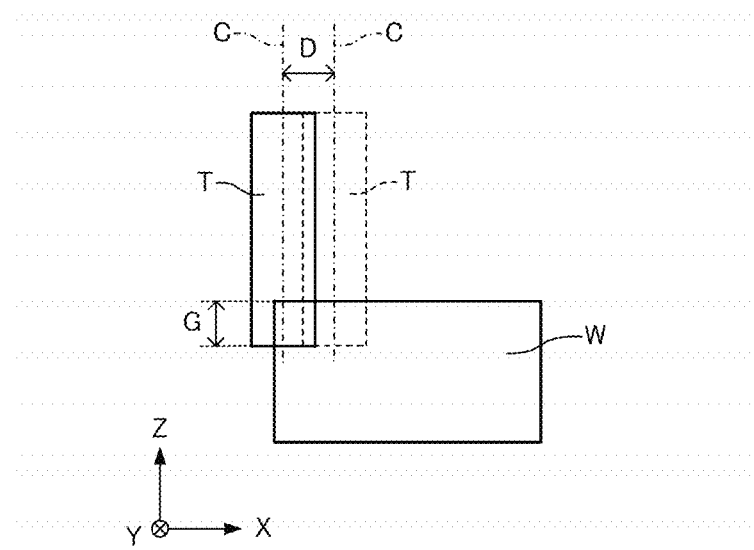
FIG. 16 is a side view for explaining the example experiment.

FIG. 15 is a perspective view for explaining an example experiment. FIG. 16 is a side view for explaining the example experiment. For convenience, the rotating tool T is illustrated in a simplified manner in FIGS. 15 and 16. As shown in FIGS. 15 and 16, a workpiece W was cut with a rotating tool T, and the shape of cutting chips was examined. The material of the workpiece W is PPS to which metal particles were added. The content of the metal particles is 40% by volume. As the metal particles, atomized powder "KUAMET" manufactured by Epson Atmix Co., Ltd. was used. The workpiece W was cut by moving the rotating tool T in the +Y-axis direction with respect to the workpiece W while rotating the rotating tool T about a rotation axis C, which is parallel to the Z-axis. As shown in FIG. 16, the direction Z-axis cutting depth G of the rotating tool T with respect to the workpiece W was set to 3 mm. Then, the rotating tool T was moved in the +X-axis direction by a side step amount D, and again moved in the +Y-axis direction with respect to the workpiece W to cut the workpiece W.

Figure 17:
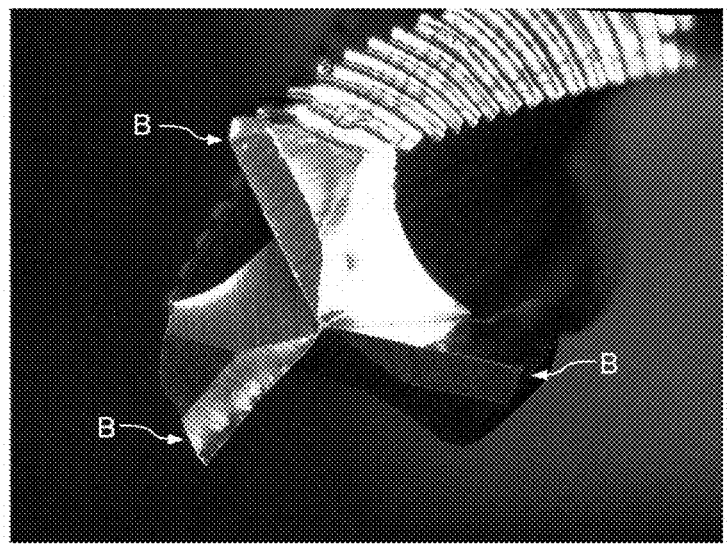
FIG. 17 is a photograph of the appearance of the rotating tool T used in the example experiment.

FIG. 17 is a photograph of the appearance of the rotating tool T. As shown in FIG. 17, the rotating tool T has three blades B. The rotating tool T is a three bladed roughing end mill. The radius of the rotating tools T is 16 mm.

FIGS. 18 and 19 are tables showing cutting conditions. As shown in FIGS. 18 and 19, the cutting conditions were changed to conditions 1 to 16. FIG. 18 shows condition 1 to condition 8. FIG. 19 shows condition 9 to condition 16.

In FIGS. 18 and 19, "rotational speed" is the rotational speed (rpm) of the rotating tool. The "moving speed" is the moving speed (ram/min) of the rotating tool T in the +Y-axis direction with respect to the workpiece W. "Peripheral speed" is the speed (m/min) of the surface due to rotation of the rotating tool. The "work amount/blade" is a value obtained by dividing the "moving speed" by the "rotating speed" and by "3", which is the number of blades. The "ratio (moving speed/rotating speed)" is a value obtained by dividing the "moving speed" by the "rotating speed".

3.2. Experimental Results

Figure 20:
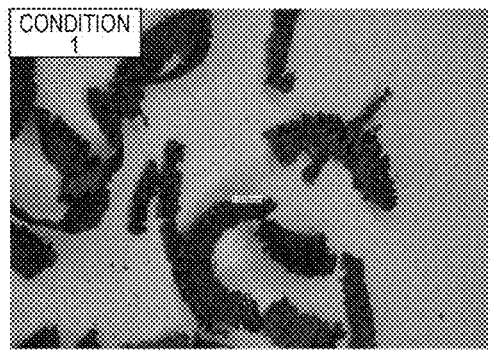
FIG. 20 is a photograph of cutting chips in the example experiment.
Figure 20:
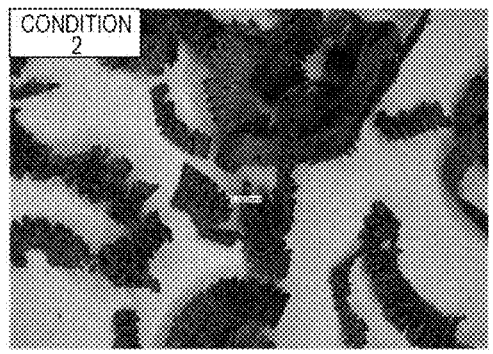
Figure 20:
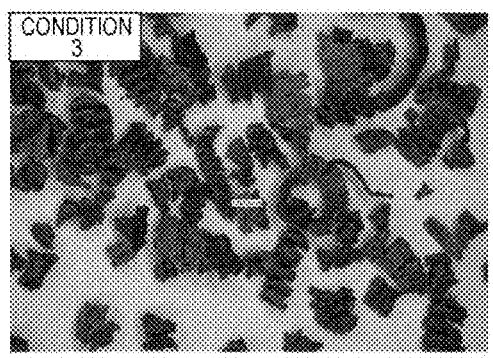
Figure 20:
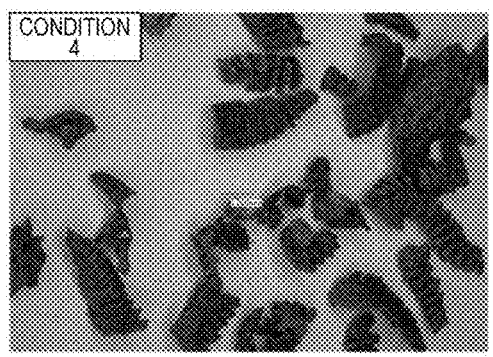
Figure 20:
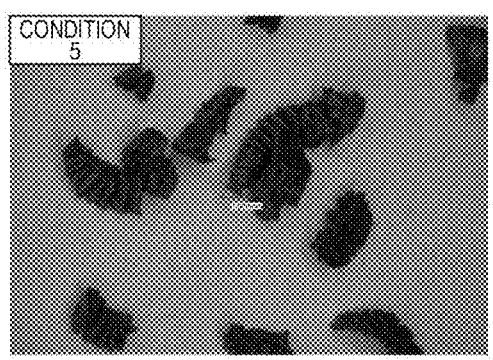
Figure 20:
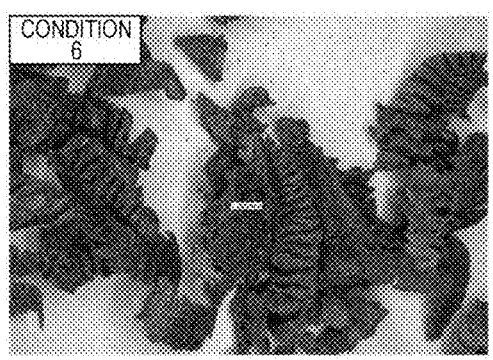
Figure 21:
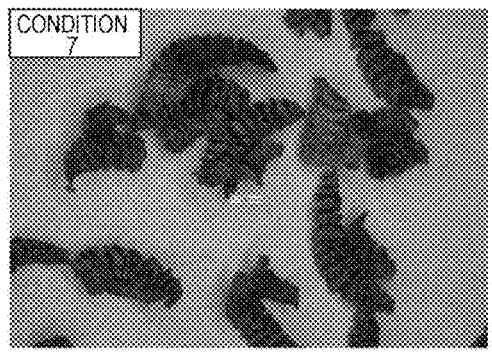
FIG. 21 is a photograph of cutting chips in the example experiment.
Figure 21:
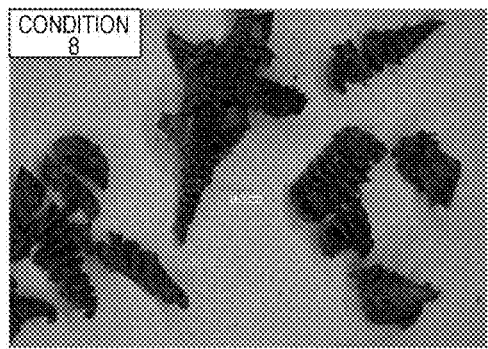
Figure 21:
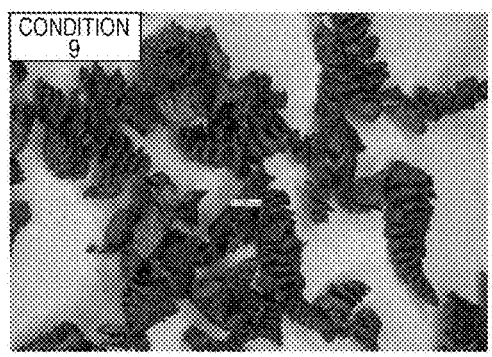
Figure 21:
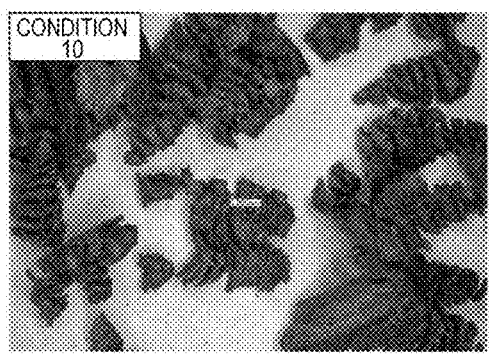
Figure 21:
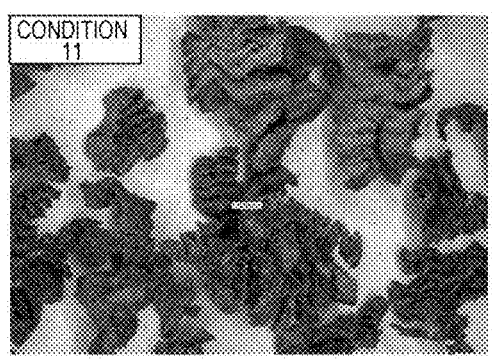
Figure 21:
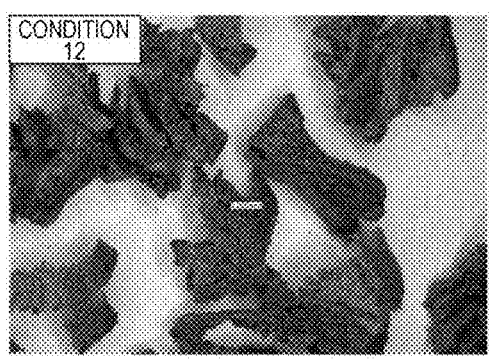

FIG. 20 is a photograph of cutting chips generated when the workpiece W is cut under condition 1 to condition 6. FIG. 21 is a photograph of cutting chips generated when the workpiece W is cut under condition 7 to condition 12. The magnification of the photographs in FIGS. 20 and 21 is 20×. Although FIGS. 20 and 21 do not show photographs of the cutting chips under the conditions 13 to 16, the cutting chips under the conditions 13 to 16 had the same shape as those under condition 12.

As shown in FIGS. 20 and 21, it was found that the smaller the ratio (moving speed/rotating speed) is, the more easily cutting chips form in a spiral shape. Under Condition 12 in which the ratio (moving speed/rotating speed) was 12, no spiral shaped cutting chips were observed. From this experiment, it was found that faster the moving speed is, and further, the slower rotating speed is, the more that spiral shaped cutting chips can be reduced.

Among the conditions 12 to 16 in which the ratio (moving speed/rotating speed) equals 12, the condition 16, in which the moving speed is the fastest, is desirable taking productivity into consideration.

The above-described embodiments and modifications are merely examples, and it is not limited thereto. For example, it is possible to appropriately combine the embodiments and the modifications.

The present disclosure includes substantially the same configuration as the configuration described in the embodiment, for example, it includes a configuration having the same function, method, and result, or a configuration having the same objective and effect. In addition, the present disclosure includes a configuration in which non-essential portions of the configuration described in the embodiment are replaced. In addition, the present disclosure includes a configuration that achieves the same effect as the configuration described in the embodiment or a configuration that can achieve the same objective as the configuration described in the embodiment. Further, the present disclosure includes a configuration in which a known technique is added to the configuration described in the embodiment.

The following contents are derived from the above-described embodiments and modifications.

An aspect of a formed article producing method, includes a first step of shaping a shaping body by ejecting a shaping material including a thermoplastic resin and of forming a first formed article by cutting the shaping body with a first rotating tool; a second step of generating recycling material by cutting the first formed article with a second rotating tool; and a third step of forming a second formed article by ejecting the recycling material that was plasticized, wherein in the second step, the first formed article is cut under at least one condition of a condition that a moving speed of the second rotating tool is faster than a moving speed of the first rotating tool in the first step or a condition that a rotating speed of the second rotating tool is slower than a rotating speed of the first rotating tool in the first step.

According to this formed article producing method, the possibility that the recycling material is formed into a spiral shape can be reduced.

In one aspect of the formed article producing method, the second rotating tool may have a blade with a roughing structure.

According to this formed article producing method, it is possible to prevent the recycling material from becoming too long in the longitudinal direction.

In one aspect of the formed article producing method, in the second step, a ratio of a moving speed (mm/min) to a rotating speed (rpm) of the second rotating tool may be 12 or more.

According to this formed article producing method, the possibility that the recycling material is formed into a spiral shape can be reduced.

In one aspect of the formed article producing method, the shaping material may include amorphous metal particles containing iron as a main component.

According to this formed article producing method, it is possible to reduce the cooling time of the formed article and reduce the heat accumulated in the formed article while forming a formed article in which filling failure and warpage are less likely to occur.

In one aspect of the formed article producing method, the amorphous metal particles may have a spherical shape.

According to this formed article producing method, it is possible to form a formed article having a small difference in elastic modulus between the first direction and the second direction, which are orthogonal to each other.

In one aspect of the formed article producing method, at least one of the first formed article and the second formed article may be at least a portion of a mold used in an injection molding device.

According to this formed article producing method, at least a portion of the mold can be formed.

In one aspect of the formed article producing method, the first formed article may be at least a portion of a mold having a cavity, and in the second step, a portion of the first formed article that does not constitute the cavity may be cut to produce the recycling material.

According to this formed article producing method, the recycling material can be produced without using a portion that was severely deteriorated by injection molding.

In one aspect of the formed article producing method, in the third step, the recycling material to which an additive has been added may be plasticized and ejected.

According to this formed article producing method, the components of the material constituting the second formed article can be more similar to the components of the material constituting the first formed article.

In one aspect of the formed article producing method, in the third step, a test piece that is integral with or separate from the second formed article may be shaped.

According to this formed article producing method, by testing the test piece in the formed article producing method, it is possible to investigate whether or not the physical properties of the second formed article deviate from the physical properties of the first formed article.

In one aspect of the formed article producing method, the shaping material may include metal particles, and in the second step, cutting chips of the first formed article may be collected by magnetic force.

According to the formed article producing method, scattering of cutting chips during cutting can be suppressed.

What is claimed is:

1. A formed article producing method, comprising:
   a first step of shaping a shaping body by ejecting a shaping material including a thermoplastic resin and of forming a first formed article by cutting the shaping body with a first rotating tool;
   a second step of generating recycling material by cutting the first formed article with a second rotating tool; and
   a third step of forming a second formed article by ejecting the recycling material that was plasticized, wherein
   in the second step, the first formed article is cut under at least one condition of
   a condition that a moving speed of the second rotating tool is faster than a moving speed of the first rotating tool in the first step, or a condition that a rotating speed of the second rotating tool is slower than a rotating speed of the first rotating tool in the first step.

2. The formed article producing method according to claim 1, wherein
the second rotating tool has a blade with a roughing structure.

3. The formed article producing method according to claim 1, wherein
in the second step, a ratio of the moving speed in mm/min of the second rotating tool to the rotating speed in rpm of the second rotating tool is 12 or more.

4. The formed article producing method according to claim 1, wherein
the shaping material includes amorphous metal particles containing iron as a main component.

5. The formed article producing method according to claim 4, wherein
the amorphous metal particles have a spherical shape.

6. The formed article producing method according to claim 1, wherein
at least one of the first formed article or the second formed article is at least a portion of a mold used in an injection molding device.

7. The formed article producing method according to claim 6, wherein
the first formed article is at least a portion of the mold used in the injection molding device having a cavity and
in the second step, a portion of the first formed article that does not constitute the cavity is cut to generate the recycling material.

8. The formed article producing method according to claim 1, wherein
in the third step, the recycling material to which an additive has been added is plasticized and ejected.

9. The formed article producing method according to claim 1, wherein
in the third step, a test piece that is integral with or separate from the second formed article is shaped.

10. A formed article producing method according to claim 1, wherein
the shaping material includes metal particles, and in the second step, the recycling material of the first formed article are collected by magnetic force.

* * * * *